(12) United States Patent
Lee

(10) Patent No.: US 6,292,180 B1
(45) Date of Patent: Sep. 18, 2001

(54) MOUNT FOR ULTRASOUND TRANSDUCER

(75) Inventor: Peter T. Lee, Cambridge, MA (US)

(73) Assignee: Virtual Ink Corporation, Boston, MA (US)

(*) Notice: Subject to any disclaimer, the term of this patent is extended or adjusted under 35 U.S.C. 154(b) by 0 days.

(21) Appl. No.: 09/346,560

(22) Filed: Jun. 30, 1999

(51) Int. Cl.[7] .................................................. G09G 5/00
(52) U.S. Cl. .................... 345/177; 178/19.02; 178/18.04
(58) Field of Search ............................ 345/173, 174, 345/175, 176, 177, 178, 179; 178/18.01, 18.03, 18.04, 19.01, 19.02, 19.03, 19.04, 19.05; 367/104, 105

(56) References Cited

U.S. PATENT DOCUMENTS

| 4,246,439 | * | 1/1981 | Romein ................................ 178/18 |
| 4,577,057 | * | 3/1986 | Blesser ................................ 178/178 |
| 4,654,648 | * | 3/1987 | Herrington et al. ................ 340/710 |
| 4,814,552 | * | 3/1989 | Stefik et al. ......................... 178/18 |

FOREIGN PATENT DOCUMENTS

WO 98/40838 * 9/1998 (WO) .

* cited by examiner

Primary Examiner—Bipin Shalwala
Assistant Examiner—Mansour M. Said
(74) Attorney, Agent, or Firm—David J. Weitz; Wilson Sonsini Goodrich & Rosati (57) ABSTRACT

An assembly for mounting an ultrasound transmitter is provided. The assembly comprises an assembly body having a proximal end, a distal end and perimeters which are perpendicular to a longitudinal axis of the assembly body. The assembly body includes a proximal mount section with a proximal outer perimeter and a proximal inner perimeter which is smaller than the proximal outer perimeter. The assembly body also includes a distal mount section with a distal outer perimeter and a distal inner perimeter which is smaller than the distal outer perimeter. A loop shaped ultrasound transducer abuts the proximal mount section and the distal mount section.

33 Claims, 12 Drawing Sheets

MOUNT FOR ULTRASOUND TRANSDUCER

BACKGROUND OF THE INVENTION

1. Field of the Invention

The present invention relates to a device having an ultrasound transducer and more particularly to a device having a mount for holding the ultrasound transducer.

2. Description of Related Art

Ultrasound has been used in a variety of positioning systems. These systems typically involve the transmission of an ultrasound signal and the calculation of the time of flight of the signal.

One application of ultrasound positioning systems has been the determination of the position of a writing element. For instance, U.S. Pat. No. 4,814,552 to Stefik et al. discloses a transcription system where an ultrasound transducer is fixed to the distal end of a stylus. The transcription system also includes ultrasound detectors coupled to a writing surface. During operation of the transcription system, the stylus writes upon the writing surface and ultrasound signals are transmitted from the ultrasound transducer to the detectors.

SUMMARY OF THE INVENTION

An assembly is provided for mounting an ultrasound transducer. The assembly may be incorporated into a variety of devices which incorporate an ultrasound transducer. For example, the device may be a stylus, erase, or mouse used in a transcription system such as the one described in U.S. patent applicant Ser. No. 09/273,921, filed Mar. 9, 1999 which is incorporated herein by reference.

In one embodiment, the assembly comprises a body having a proximal end, a distal end and perimeters which are perpendicular to a longitudinal axis of the assembly body. The assembly body includes a proximal mount section having an outer perimeter and an inner perimeter distal to the outer perimeter. The inner perimeter is smaller than the outer perimeter. A distal mount section is positioned distal to the proximal mount section. The distal mount section has an outer perimeter and an inner perimeter proximal to the outer perimeter. The inner perimeter is smaller than the outer perimeter. A loop shaped ultrasound transducer surrounds the assembly body adjacent the proximal and distal mount sections such that a proximal edge of the ultrasound transducer conforms to a shape of the proximal mount section adjacent where the proximal edge contacts the proximal mount section and a distal edge of the ultrasound transducer conforms to a shape of the distal mount section adjacent where the distal edge contacts the distal mount section.

A kit for forming an assembly for mounting an ultrasound transmitter is also provided. The kit may be used to form a device which includes the ultrasound transmitter. In one embodiment, the kit includes a proximal member having perimeters which are perpendicular to a longitudinal axis of the proximal member. The proximal member includes a proximal mount section having an inner perimeter and an outer perimeter proximal to the inner perimeter. The outer perimeter is larger than the inner perimeter. A distal member has perimeters which are perpendicular to a longitudinal axis of the distal member. The distal member includes a distal mount section having an inner perimeter and an outer perimeter distal to the inner perimeter. The outer perimeter is larger than the inner perimeter. The proximal member is adapted to be coupled to a proximal end of the distal member such that a loop shaped ultrasound transducer surrounding the proximal and distal members adjacent the proximal and distal mount sections conforms to a shape of the proximal mount section adjacent where the ultrasound transducer contacts the proximal mount section and conforms to a shape of the distal mount section adjacent where the ultrasound transducer contacts the distal mount section.

According to the kit embodiment, the proximal member and distal member, when coupled together, may define a section between the inner perimeters of the proximal and distal mount sections having a perimeter that is smaller than the inner perimeters of the proximal and distal mount sections. The section between the inner perimeters of the proximal and distal mount sections may optionally have a cylindrical shape. The distal mount section may also be configured to be coupled with a distal end of the proximal member. The distal mount section may include a port for receiving the distal end of the proximal member. The distal mount section may also include a flange for limiting movement of the proximal member within the port.

According to any of the above embodiments, the proximal mount section may transition in a proximal direction from the inner perimeter to the outer perimeter in a continuously changing manner and the distal mount section may transition in a distal direction from the inner perimeter to the outer perimeter in a continuously changing manner. The transitions of the proximal and distal mount sections from the inner perimeters to the outer perimeters may each form a surface having a curved contour parallel to the longitudinal axis of the assembly body. The transitions of the proximal and distal mount sections from the inner perimeters to the outer perimeters may also each form a surface having a linear contour parallel to the longitudinal axis of the assembly body. The proximal and distal mount section may also transition from the inner perimeter to the outer perimeter in a stepwise manner.

A feature of the assembly and kit is that the proximal and distal mount members can be used to maintain the ultrasound transducer in a predetermined shape. For example, in one embodiment, the ultrasound transducer is maintained in a substantially cylindrical shape. The proximal and distal edges of the ultrasound transducer may have perimeters which are about a same size as the inner perimeters of the proximal and distal mount sections. Alternatively, the proximal and distal edges of the ultrasound transducer having perimeters which are larger than the inner perimeters of the proximal and distal mount sections. Alternatively, the ultrasound transducer may be smaller, proximal and distal mount sections radially distending the proximal and distal edges of the ultrasound transducer.

The assembly body may be designed to include a contracted section extending between the inner perimeter of the proximal mount section and the inner perimeter of the distal mount section. This allows the ultrasound transducer to not contact the assembly body between where the ultrasound transducer contacts the proximal and distal mount sections. As a result, an air gap is formed between the ultrasound transducer and a assembly body. In one embodiment, the contracted section has a cylindrical shape.

A method is also provided for assembling an ultrasound transmitter. In one embodiment, the method comprises taking a loop shaped ultrasound transducer; and joining proximal and distal mount members such that the loop shaped ultrasound transducer surrounds a union of the proximal and distal mount members, the proximal mount member having a surface which abuts a proximal edge of the ultrasound transducer and the distal mount member having a surface which abuts a distal edge of the ultrasound transducer. According to the method, an air gap may be formed between the ultrasound transducer and the union of the proximal and distal mount members. Also according to the method, the loop shaped ultrasound transducer may conform to a shape of the proximal mount section adjacent where the ultrasound transducer contacts the proximal mount section and conforms to a shape of the distal mount section adjacent where the ultrasound transducer contacts the distal mount section. Also according to the method, the proximal and distal mount members may maintain a surface of the ultrasound transducer in a substantially cylindrical shape.

BRIEF DESCRIPTION OF THE FIGURES

FIGS. 2A–2F illustrate different relationships between a loop shaped ultrasound transducer, a proximal mount section and a distal mount section of a stylus.

FIGS. 3A–3F illustrate an embodiment of a stylus constructed from a proximal member and a distal member.

FIGS. 4A–4B illustrate another embodiment of a stylus having a proximal member and a distal member.

FIGS. 5A–5C illustrates yet another embodiment of a stylus having a proximal member and a distal member.

FIG. 6A–6D illustrate a method for assembling a stylus according to the present invention.

DETAILED DESCRIPTION

The invention relates to an assembly for mounting an ultrasound transducer. The assembly may be incorporated into a stylus for transmitting ultrasound signals. The assembly includes an assembly body with proximal and distal ends. The stylus body includes a proximal mount section and a distal mount section aligned with a longitudinal axis of the assembly. The proximal mount section and the distal mount section each include a plurality of perimeters perpendicular to the longitudinal axis. Specifically, the proximal mount has an inner perimeter and an outer perimeter distal to the inner perimeter which is larger than the inner perimeter. Similarly, the distal mount section has an inner perimeter and an outer perimeter proximal to the inner perimeter which is larger than the inner perimeter. The assembly also includes an ultrasound transducer positioned between the proximal mounting section and the distal mounting section.

The ultrasound transducer can be a loop shaped ultrasound transducer which encircles the assembly body adjacent the proximal and distal mount sections. A proximal edge of the ultrasound transducer conforms to a shape of the proximal mount section adjacent where the proximal edge contacts the proximal mount section and a distal edge of the ultrasound transducer conforms to a shape of the distal mount section adjacent where the distal edge contacts the distal mount section. As a result, one is able to control the shape of the ultrasound transducer using the mount members. For example, the ultrasound transducer may be maintained in a substantially cylindrical shape to enhance the uniformity of the ultrasound signal. Other shapes, depending on the application, may also be formed.

The ultrasound transducer is preferably sized to immobilize the ultrasound transducer relative to the assembly. This may be achieved in a variety of manners. For example, the proximal and distal edges of the ultrasound transducer may have perimeters which are about a same size as the inner perimeters of the proximal and distal mount sections. Alternatively, the proximal and distal edges of the ultrasound transducer having perimeters which are larger than the inner perimeters of the proximal and distal mount sections but smaller than the outer perimeters of the mount sections. Alternatively, the proximal and distal edges of the ultrasound transducer may be smaller than the proximal and distal mount sections and be capable of being radially distended by the mount sections. Alternatively, the assembly may include flanges for preventing motion of the ultrasound transducer relative to the assembly.

In one particular embodiment, the loop shaped ultrasound transducer has a proximal edge positioned adjacent to the proximal mounting section and a distal edge positioned adjacent to the distal mounting section. The proximal edge of the ultrasound transducer is smaller than the outer perimeters of the proximal and distal mounting sections. As a result, the outer perimeters prevent the ultrasound transmitter from sliding over the proximal and distal mounting sections. Because the ultrasound transducer is positioned between the proximal mounting section and the distal mounting section, the proximal mounting section and the distal mounting section act together to restrict translational movement of the ultrasound transducer relative to the assembly body.

The proximal mounting section and the distal mounting section may be arranged so the proximal edge of the ultrasound transducer contacts the proximal mounting section concurrently with the distal edge of the ultrasound transducer contacting the distal mounting section. In this embodiment, the proximal mounting section and the distal mounting section act together to prevent translational movement of the ultrasound transducer relative to the assembly body. Accordingly, the proximal and distal mounting sections serve to substantially immobilize the ultrasound transducer relative to the assembly body.

The ultrasound transducer may also be suspended between the proximal mount section and the distal mount section so the ultrasound transducer does not contact the assembly body between where the ultrasound transducer contacts the proximal mount section and where the ultrasound transducer contacts the distal mount section. As a result, an air gap is formed between the ultrasound transducer and a portion of the assembly body. Forming an air gap between the ultrasound transducer and the assembly body can help decouple the ultrasound transducer from the assembly body. Decoupling the ultrasound transducer from the assembly body can increase the quality of the ultrasound produced from the ultrasound transmitter. For instance, when an ultrasound transducer is coupled to the portion of a assembly body having a non-uniform construction, the non-uniform construction can translate into production of ultrasound energy which is also non-uniform. However, decoupling the ultrasound transducer from the assembly body reduces the effects of a non-uniform assembly body construction on the uniformity of the ultrasound transmitted from the ultrasound transducer. As a result, an air gap between the ultrasound transducer and the assembly body can increase the quality of ultrasound produced from the assembly.

As discussed above, the shapes of proximal and distal mount sections can be used to control the shape of ultrasound transducer. For instance, when the proximal and distal edges of the ultrasound transducer sit flush against the proximal and distal mount sections, the proximal and distal edges take on the shape of the mount section where the edge intersects the mount section. The mount sections preferably have circular outer perimeters. When the mount sections have these geometries and the edges of the ultrasound transducer sit flush against the mount sections, the edges of the ultrasound transducer retain the circular shape of mount sections at the intersection of the edges of the ultrasound transducer and the mount sections.

The mount sections may also have elliptical perimeters which are each concentric with a longitudinal axis of the assembly. When the edges of the ultrasound transducer have a circular geometry and the edges of the ultrasound transducer sit flush against the mount sections, the edges of the ultrasound transducer adopt the elliptical shape of the mount sections.

The shapes of the mount sections may be matched to each other and used to control the overall geometry of the ultrasound transducer. For instance, the surfaces of the proximal and distal mount sections preferably have circular perimeters which are each concentric with a longitudinal axis of the assembly. Further, the proximal and distal edges of the ultrasound transducer preferably have circular shapes or are sufficiently flexible to conform to the shape of the mount sections. As described above, when the edges of the ultrasound transducer sit flush against the mount sections, the proximal edge and the distal edge will each have circular shapes. Because the proximal edge and the distal edge both have circular shapes, the circular shape will be retained along the length of the ultrasound transducer.

Figure 1A:
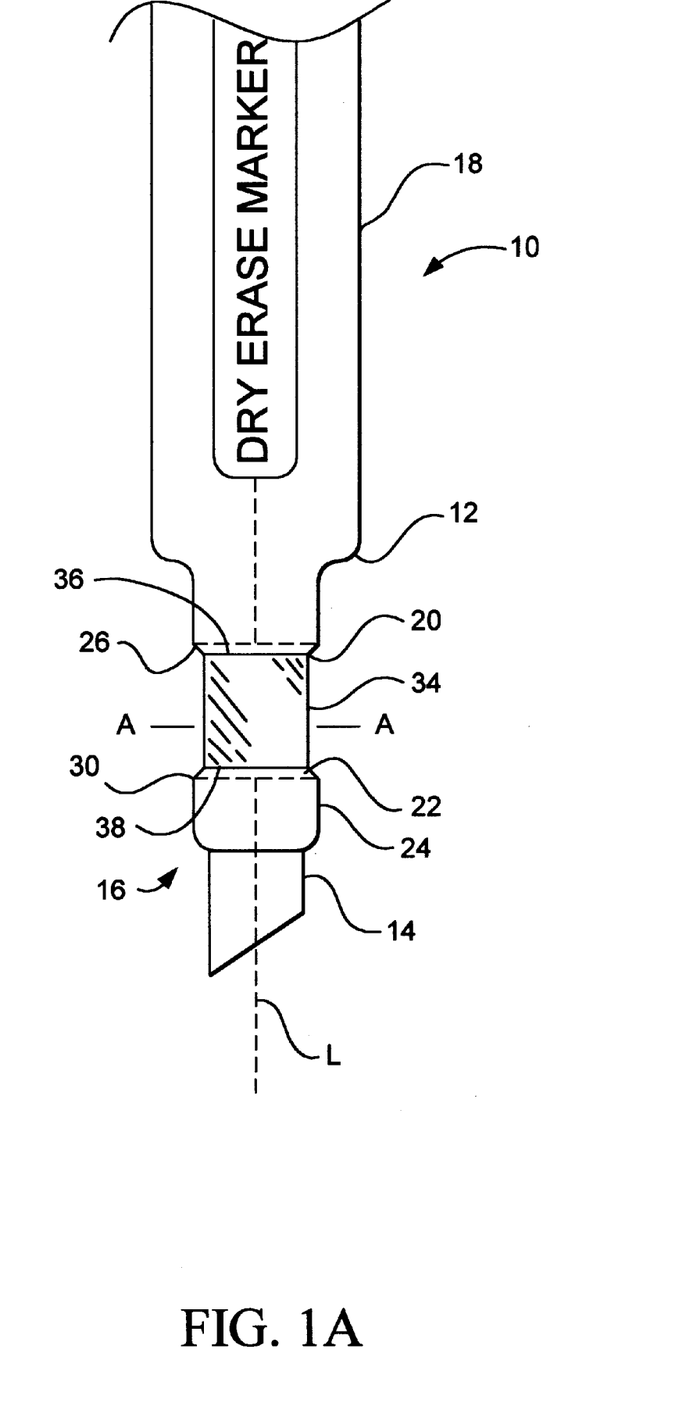
FIG. 1A is sideview of a stylus according to the present invention.
Figure 1B:
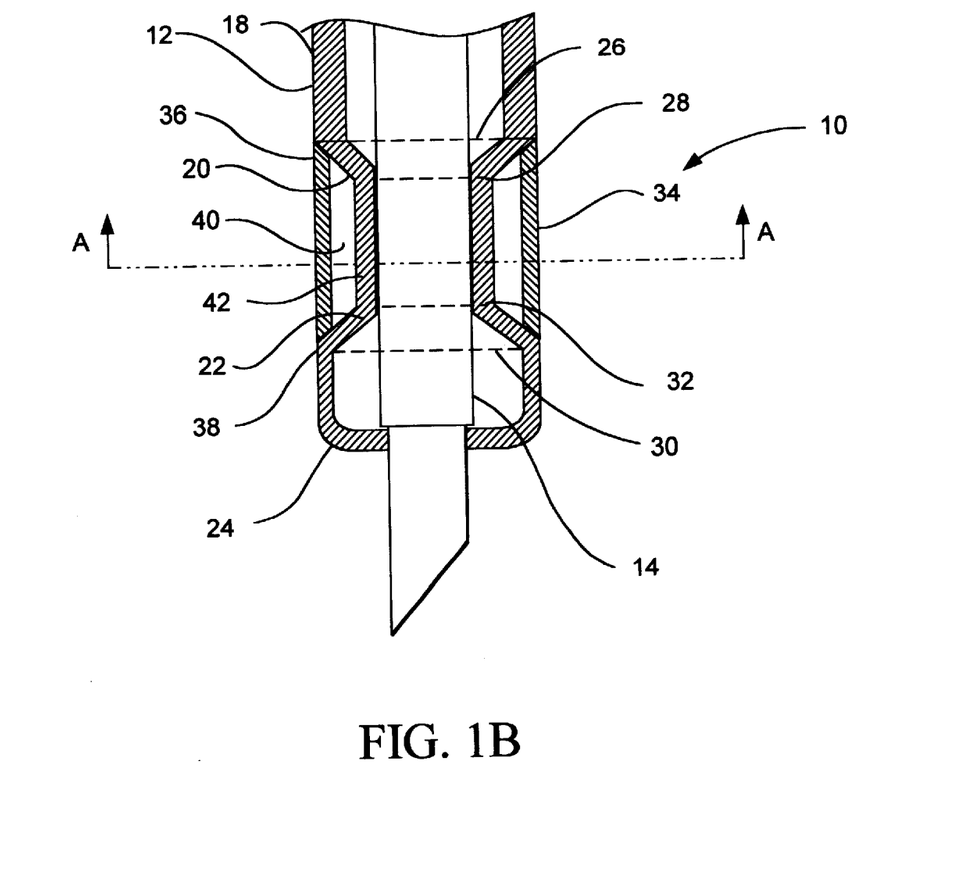
FIG. 1B is a cross section of a stylus according to the present invention looking laterally across the stylus.
Figure 1C:
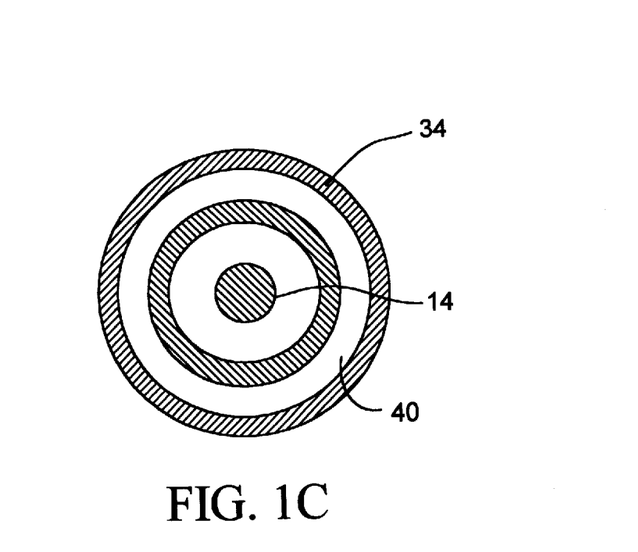
FIG. 1C is a cross section of a stylus according to the present invention looking longitudinally down the stylus.

FIGS. 1A–1C illustrate a stylus 10 according to the present invention. FIG. 1A provides a sideview of a stylus 10 and FIG. 1B illustrates a cross section of a stylus 10 looking laterally across the stylus 10. FIG. 1C illustrates a cross section of the stylus 10 taken at the position marked A in FIGS. 1A and 11B. The stylus 10 includes a hollow stylus body 12 enclosing a writing implement. The writing implement 14 extends through the stylus body 12 and out of an operative end 16 of the stylus 10 so the stylus 10 can be used to write upon a writing surface. Suitable writing elements include, but are not limited to, pencil lead, inkwells, chalk and other implements for marking writing surfaces. Although FIGS. 1A–1C illustrate a hollow stylus body 12, the stylus body 12 can be solid. For instance, the stylus body 12 can be solid when the stylus 10 is a pointer for pointing at a flat surface such as a chalkboard.

The stylus body 12 includes a first body section 18, a proximal mount section 20, a distal mount section 22 and a second body section 24 aligned along a longitudinal axis, L, of the stylus body 12. A plurality of perimeters are perpendicular to a longitudinal axis of the stylus. For instance, the proximal mount section 20 includes a proximal outer perimeter 26 and a proximal inner perimeter 28 which is smaller than the proximal outer perimeter 26. Similarly, the distal mount section 22 includes a distal outer perimeter 30 and a distal inner perimeter 32 which is smaller than the distal outer perimeter 30.

A loop shaped ultrasound transducer 34 has a proximal edge 36 abutting the proximal mount section 20 and a distal edge 38 abutting the distal mount section 22. In one embodiment, the edges of the ultrasound transducer 34 have perimeters which are smaller than the inner perimeters of the proximal and distal mount sections 20, 22. According to this embodiment, the proximal and distal edges 36, 38 of the transducer 34 may be radially distended by the mount sections. In another embodiment, the edges of the ultrasound transducer 34 have interior perimeters which are the same size or larger than the inner perimeters of the proximal and distal mount sections 20, 22. According to this embodiment, the proximal and distal edges 36, 38 of the transducer 34 may be radially distended by the mount sections or may be rigid. When the proximal edge outside perimeter is the same size as the proximal outer perimeter 26, the proximal edge 36 of the ultrasound transducer 34 can be flush with the inner sections of the proximal and distal mount sections 20, 22 as illustrated in FIG. 1B.

Figure 2A:
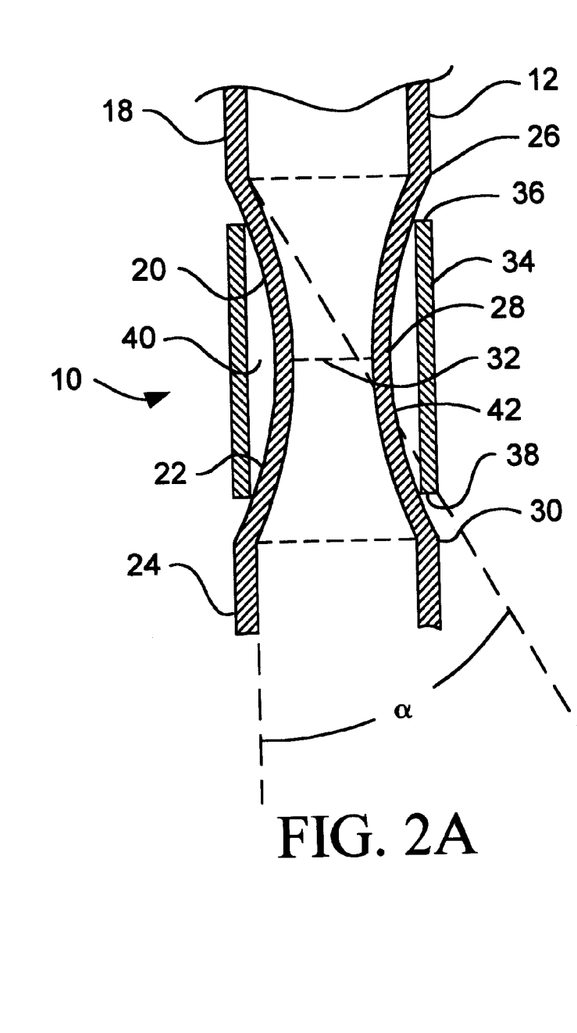
FIG. 2A illustrates the proximal mount section transitioning between a proximal inner perimeter and a proximal outer perimeter in a continuously changing manner.

The ultrasound transducer 34 is suspended between the surface of the proximal mount section 20 and the surface of the distal mount section 22. An air gap 40 is formed between the ultrasound transducer 34 and the stylus body 12. As illustrated in FIG. 1C, the air gap 40 can extend all the way around the stylus body 12. As illustrated in FIG. 1B, a contracted section 42 can extend between the proximal mount section 20 and the distal mount section 22. However, the contracted section 42 is optional as illustrated in FIG. 2A where the contracted section 42 has been eliminated by coupling the proximal mount section 20 directly to the distal mount section 22. The air gap 40 can be formed adjacent to the contracted section 42 and/or adjacent to the proximal mounting section and/or the distal mounting section.

Figure 2B:
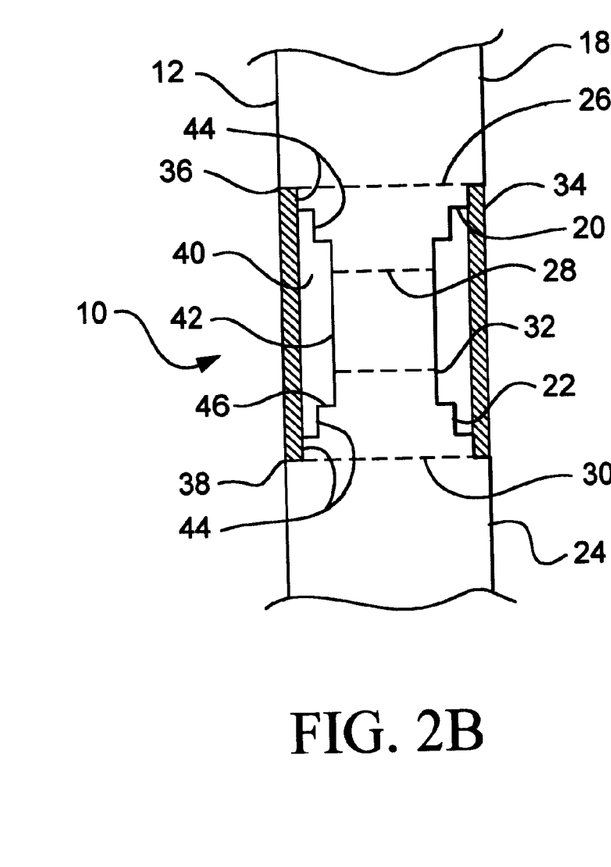
FIG. 2B illustrates a proximal mount section which transitions from a proximal inner perimeter to a proximal outer perimeter in a stepwise manner.

As illustrated in FIG. 2B, the proximal and distal mount sections 20, 22 each independently transition from an inner perimeter to an outer perimeter in a step-wise fashion. The ultrasound transducer 34 is suspended between a step 44 on the proximal mount section 20 and a step 44 on the distal mount section 22. The proximal edge 36 of the ultrasound transducer 34 adopts the shape of the step 44 on the proximal mount section 20 and the distal edge 38 of the ultrasound transducer 34 adopts the shape of the step 44 on the distal mount section 22. Further, the side 46 of the step 44 on the proximal mount section 20 and the side 46 of the step 44 on the distal mount section 22 prevent movements of the ultrasound transducer 34 in a longitudinal direction relative to the stylus 10. Accordingly, the sides 46 of the steps 44 can reduce translation of the ultrasound transducer 34 relative to the stylus body 12. Steps 44 on the proximal mount section 20 can have a different shape than steps 44 on the distal mount section 22, however, the steps 44 on the proximal mount section 20 preferably have the same shape as the steps 44 on the distal mount section 22.

The proximal and distal mount sections 20, 22 preferably each independently change in perimeter continuously between their respective inner perimeters and outer perimeters. As illustrated in FIG. 2A, a surface of a mount section between the inner and outer perimeters may form a surface having a curved contour parallel to the longitudinal axis of the stylus body 12. Alternatively, as illustrated in FIG. 1B, a surface of a mount section between the inner and outer perimeters may form a surface having a linear contour parallel to the longitudinal axis of the stylus body 12.

When the proximal mount section 20 and the distal mount section 22 expand continuously from the proximal inner perimeter 28 to the proximal outer perimeter 26, they can be moved close enough to one another to act as wedges which lift the edges of the ultrasound transducer 34 off a contracted section 42 between the mount sections. The wedge action from the proximal mount section 20 and the distal mount section 22 cause the suspension of the ultrasound transducer 34 between proximal mount section 20 and the distal mount section 22. Further, the proximal mount section 20 and the distal mount section 22 can be close enough to one another that the proximal edge inside perimeter of the ultrasound transducer 34 contacts the surface of the proximal mount section 20 concurrently with the distal edge inside perimeter of the ultrasound transducer 34 contacting the surface of the distal mount section 22. With this arrangement, the ultrasound transducer 34 intersects the surface of the mount section at the angle labeled a in FIG. 2A. The angle α is preferably between 0–90°, more preferably 10–45° and most preferably 20–30°.

Figure 2C:
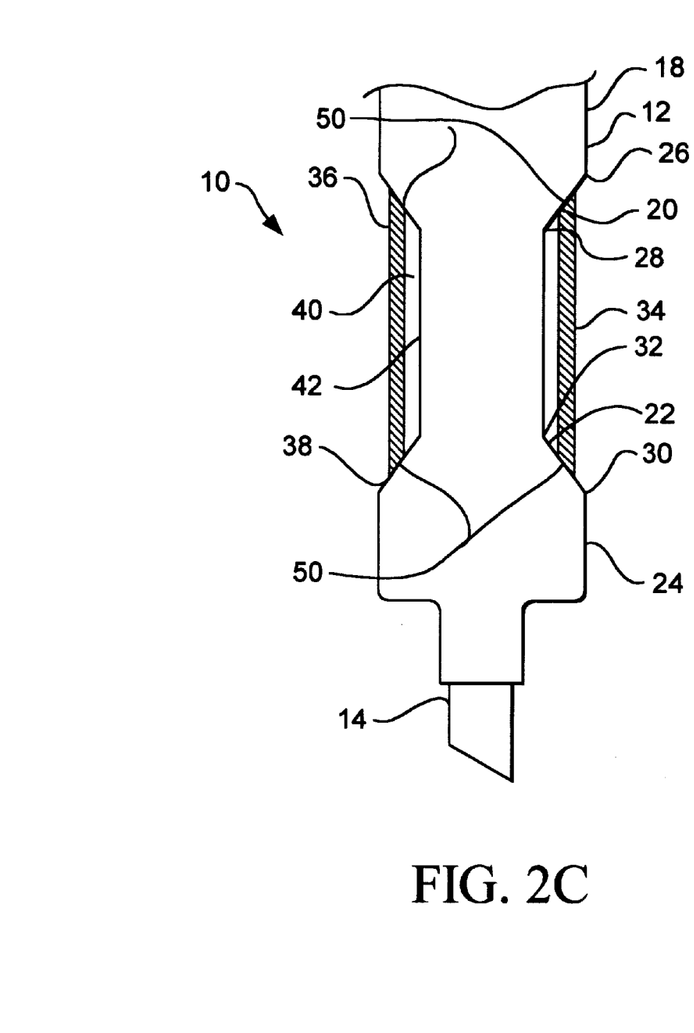
FIG. 2C illustrates an ultrasound transducer having tapered edges abutting the proximal mount section and the distal mount section.
Figure 2D:
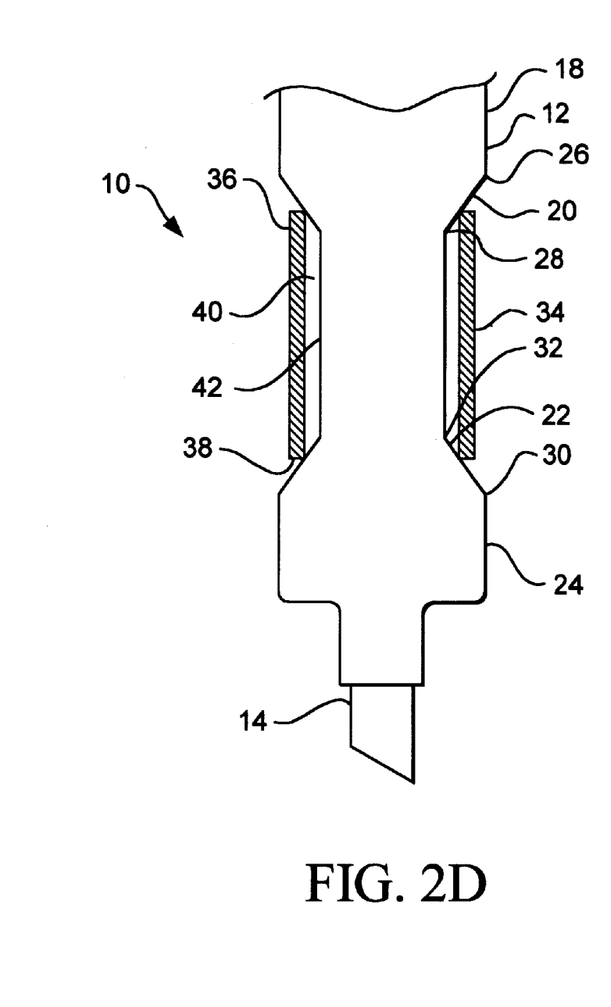
FIG. 2D illustrates an ultrasound transducer having straight edges abutting the proximal section and the distal mount section.

FIG. 2C illustrates an ultrasound transducer 34 having tapered edges 50 at opposed ends of the ultrasound transducer 34. The taper of the edges match the contour of surface of the proximal mount section 20 and/or the contour of the surface of the distal mount section 22. This taper allows the ends of the ultrasound transducer 34 to sit flush against the surface of the proximal mount section 20 and/or flush against the surface of the distal mount section 22. As illustrated in FIG. 2D the ultrasound transducer 34 can have non-tapered edges. As illustrated, the edges of the ultrasound transducer 34 do not sit flush against the stylus body 12.

Figure 2E:
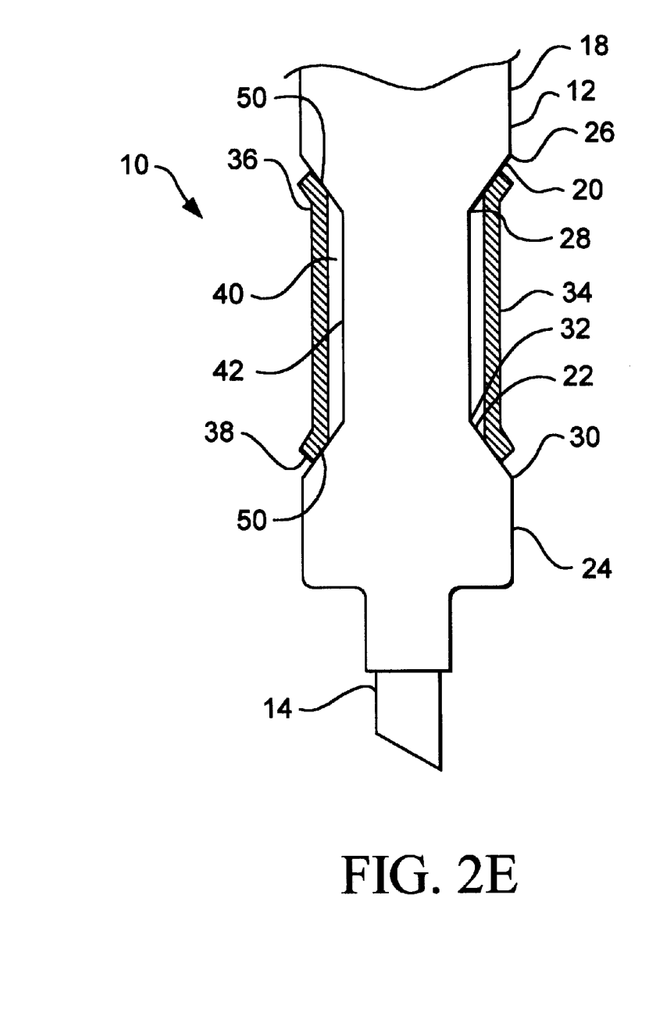
FIG. 2E illustrates an ultrasound transducer having flared edges abutting the proximal section and the distal mount section.

FIG. 2E illustrates an ultrasound transducer 34 having flared ends. As used herein, a flared end refers to an end having a perimeter which is larger than a perimeter of a section interior to the end. The flared ends can have a contour matching the contour of the surface of the proximal mount section 20 and/or the contour of the surface of the distal mount section 22. The matching contours increase the contact area between the stylus body 12 and the ultrasound transducer 34 in order to further immobilize the ultrasound transducer 34 relative to the stylus body 12. The effects of the flared ultrasound transducer 34 ends can be created by moving the first expansion surface close enough to the second expansion surface that the ends of the ultrasound transducer 34 distend in order to fit over the first expansion section and/or the second expansion section. The distension of these ends can cause enough friction between the ultrasound transducer 34 and the first and second expansion surfaces to cause rotational and translational immobilization of the ultrasound transducer 34 relative to the stylus body 12.

Figure 2F:
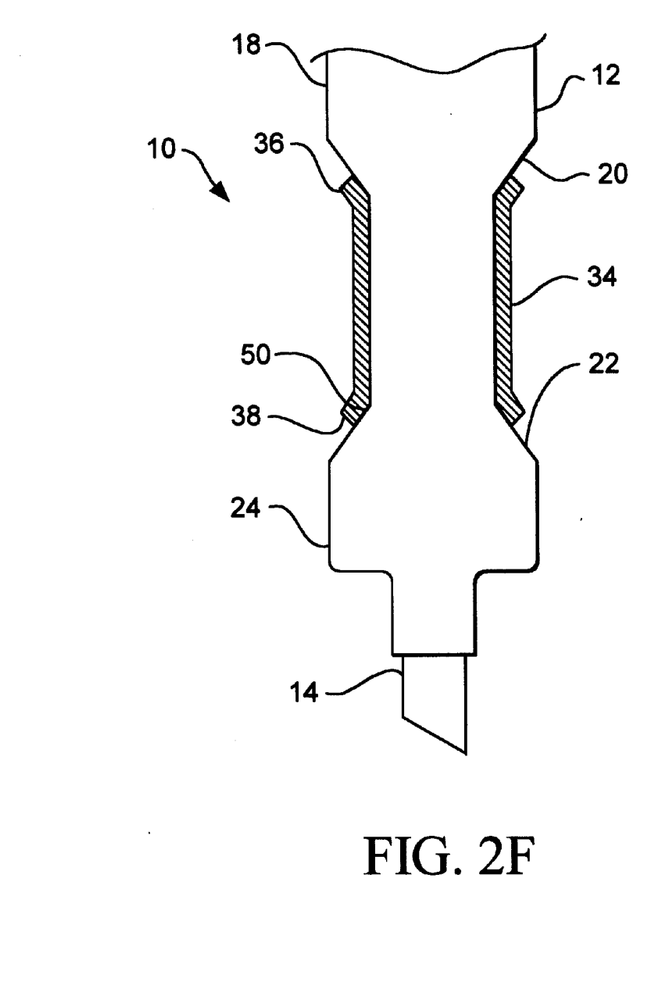
FIG. 2F illustrates a stylus having an ultrasound transducer which contacts the stylus body along the width of the ultrasound transducer.

FIG. 2F illustrates an embodiment where there is no air gap between the stylus body 12 and the ultrasound transducer 34. The ultrasound transducer 34 contacts the stylus body 12 along the width of the ultrasound transducer 34.

Figure 3A:
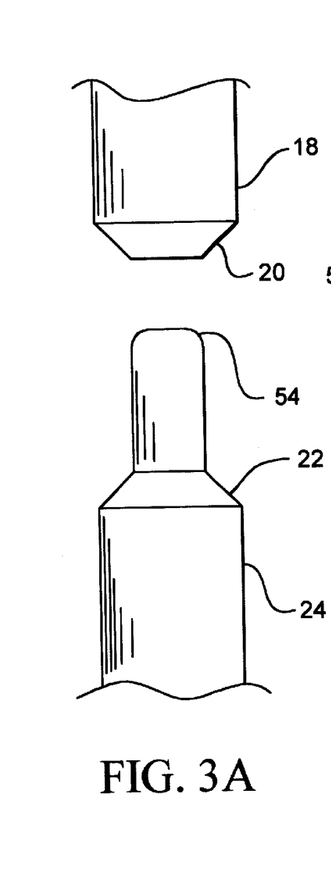
FIG. 3A is a sideview of the proximal member and the distal member.
Figure 3B:
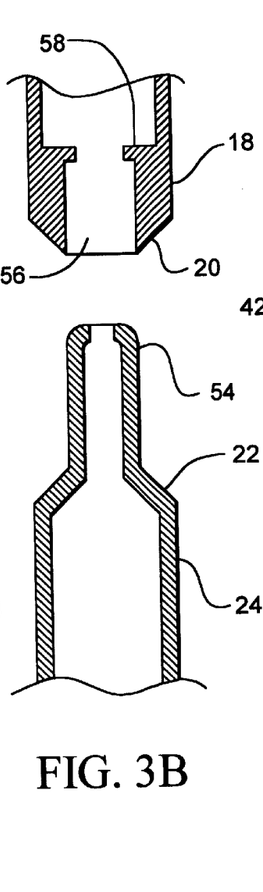
FIG. 3B is a cross section of the proximal member and the distal member.
Figures 3C, 3D:
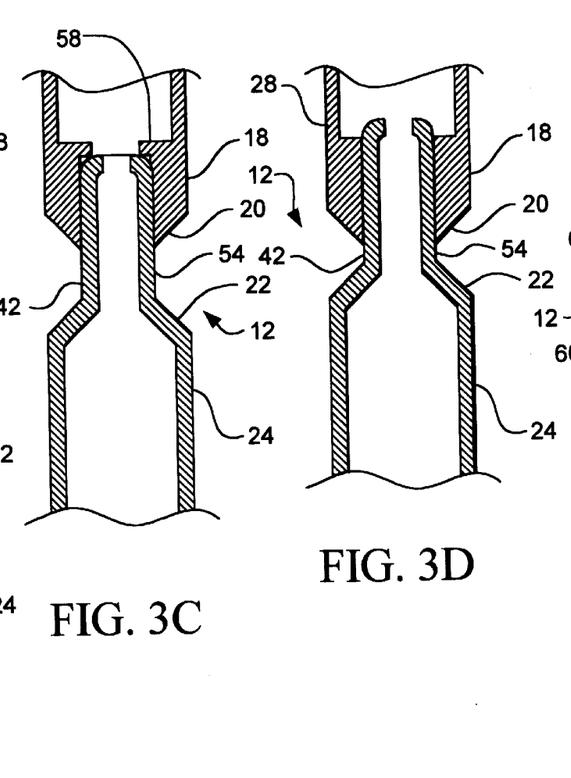
FIG. 3C illustrates the proximal member coupled with the distal member.
FIG. 3D illustrates the proximal member slidably coupled with the distal member so as to provide a contracted section with an adjustable length.

FIGS. 3A–3F illustrate an embodiment of a stylus 10 constructed from a proximal member and a distal member which are attachable to each other. FIG. 3A is a sideview of the proximal member and the distal member while FIG. 3B is a cross section of the proximal member and the distal member. The proximal member includes a proximal mount section 20 coupled with an insert 54. The distal member includes a distal mount section 22 coupled with an insert receiving port 56. The stylus 10 can be assembled by inserting the insert 54 into the insert receiving port 56 as illustrated in FIGS. 3C and 3D. Other attachment mechanisms are also possible.

FIG. 3C illustrates the insert receiving port 56 including a stopping flange 58 which serves to stop the forward progress of the insert 54 into the insert receiving port 56. The portion of the insert 54 left extending from the distal mount section 22 becomes the contracted section 42 of the stylus 10. Each stylus body 12 can be assembled with the same length contracted section 42 by positioning the insert 54 into the insert receiving port 56 until the insert 54 reaches the stopping flange 58. FIG. 3D illustrates an insert receiving port 56 without a stopping flange 58. Without a stopping flange 58, the insert 54 can be slid into the insert receiving port 56 to provide a stylus 10 having a contracted section 42 with a desired length.

Figure 3E:
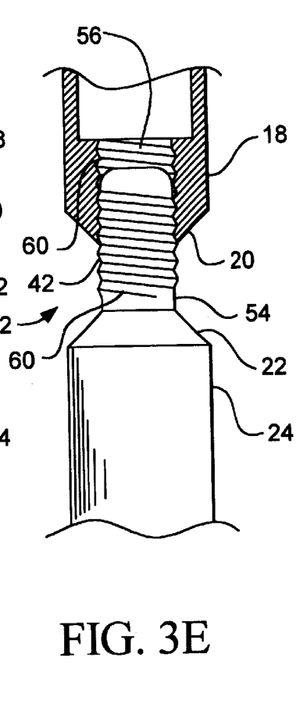
FIG. 3E illustrates a proximal member and a distal member having complementary threads.

The insert 54 and the insert receiving port 56 can include complementary threads 60 as illustrated in FIG. 3E. Accordingly, the proximal member and the distal member can be screwed together. This thread arrangement allows the length of the contracted section 42 to be adjusted by rotating the proximal member relative to the distal member.

Figure 3F:
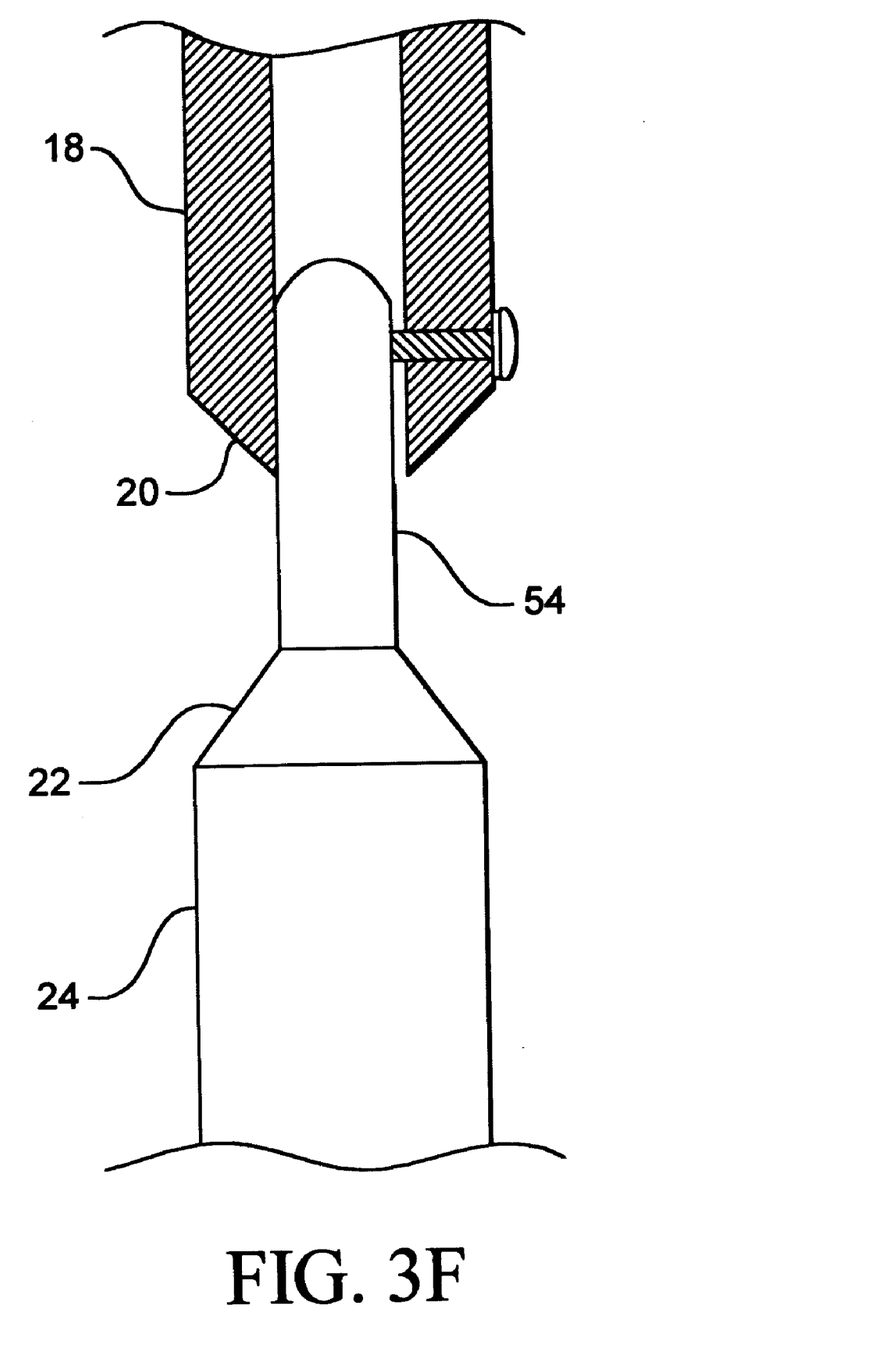
FIG. 3F illustrates another embodiment of a stylus with a locking mechanism for immobilizing the distal member relative to the proximal member.

The proximal member 18 or the distal member 24 can include a locking mechanism to immobilize the distal member 24 relative to the proximal member. FIG. 3F illustrates a locking mechanism which includes a set screw 61 extending through the proximal member 18 into contact with the insert 54. The set screw can be tightened to immobilize the distal member 24 relative to the proximal member or can be loosened to the distal member 24 relative from the proximal member. Although the set screw is illustrated in the proximal member, a set screw can also be included in the distal member 24. Other interlocking arrangements may also be employed.

Figure 4A:
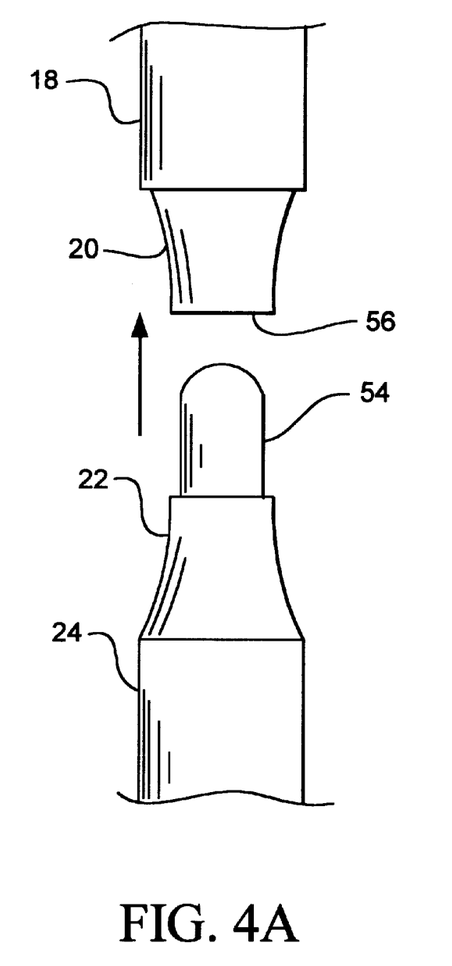
FIG. 4A is a sideview of the proximal member and the distal member separated from one another.
Figure 4B:
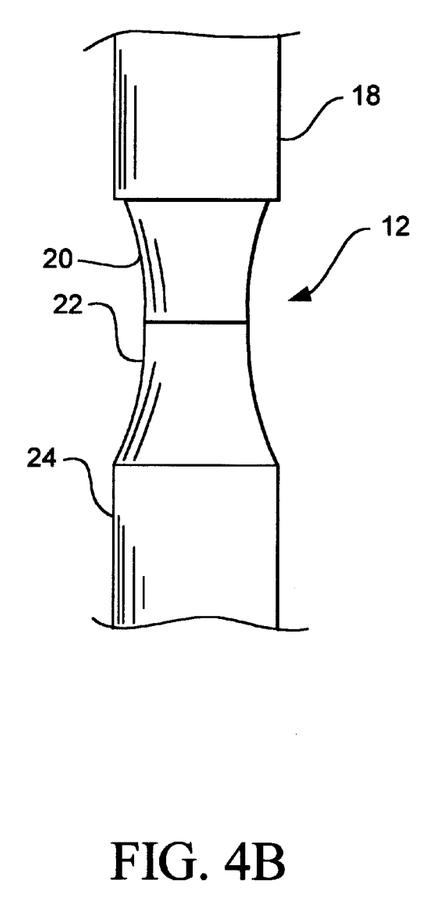
FIG. 4B is a sideview of a the proximal member coupled with the distal member so the proximal mount section is adjacent to the distal mount section.

FIGS. 4A and 4B illustrate an embodiment of a stylus 10 configured to be assembled without a contracted section 42 between the proximal and distal mount sections 20, 22. The proximal member includes an insert 54 while the distal member includes an insert receiving port 56. FIG. 4B illustrates the insert 54 of the proximal member inserted into the insert receiving port 56 of the distal member until the insert 54 is received entirely within the insert receiving port 56.

Although FIGS. 3A–3F and 4A–4B illustrate the proximal mounting section including the insert 54 and the distal mounting section including the insert receiving port 56, the distal mounting section can include the insert 54 and the proximal mounting section can include the insert receiving port 56.

Figure 5A:
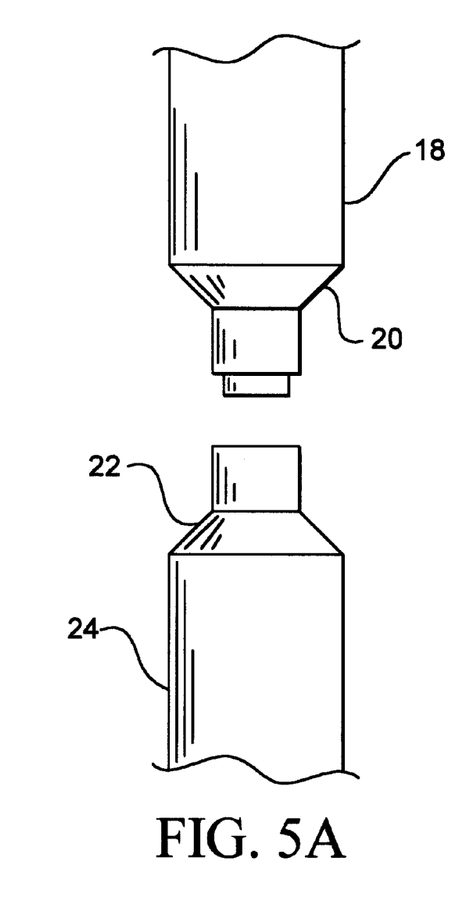
FIG. 5A is a sideview of the proximal member including a first insert and the distal member including a second insert.
Figure 5B:
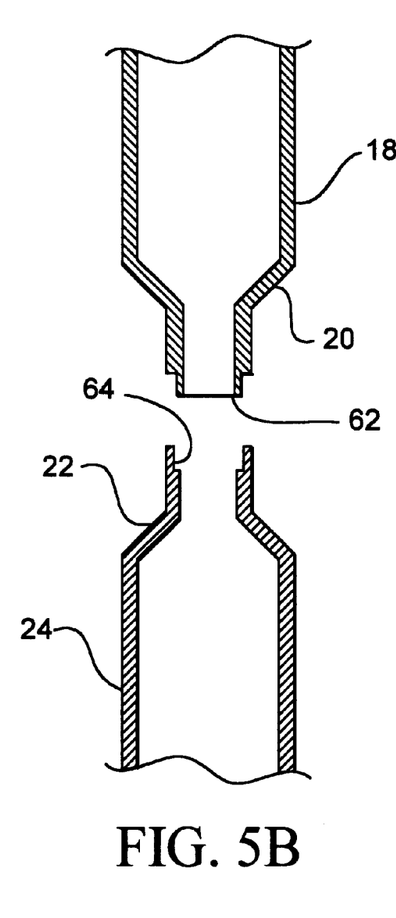
FIG. 5B is a cross section of the proximal member including a first insert and the distal member including a second insert.
Figure 5C:
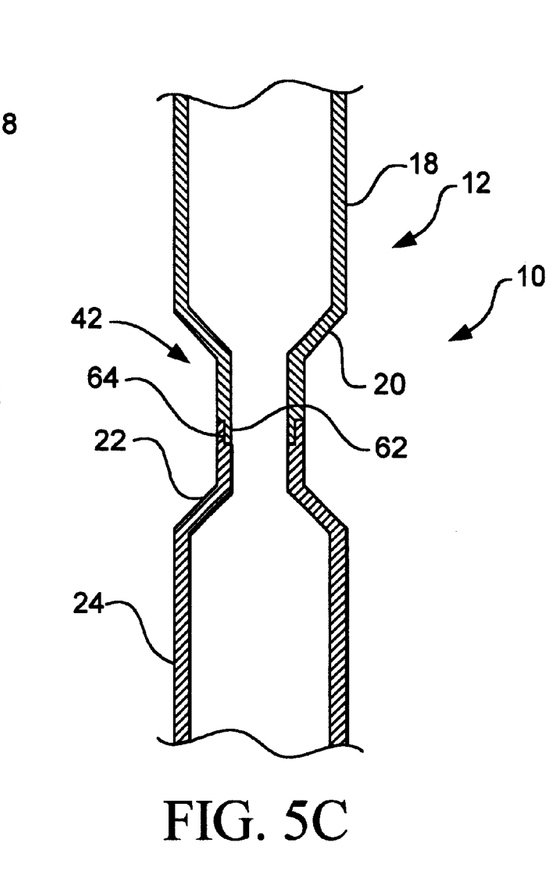
FIG. 5C illustrates the first insert coupled with the second insert.

FIGS. 5A–5C illustrate another embodiment of a stylus 10 constructed from a proximal member and a distal member. FIG. 5A is a sideview of the proximal member and the distal member while FIG. 5B is a cross section of the proximal member and the distal member. The proximal member includes a proximal contracted section 42 having a raised edge 62 and the distal member includes a distal contracted section 42 having a recess 64 which is complementary to the raised edge 62 of the proximal contracted section 42. As illustrated in FIG. 5C, the raised edge 62 of the proximal contracted section 42 can be received within the recess 64 of the distal contracted section 42 to form the contracted section 42 of the stylus body 12.

Figure 6A:
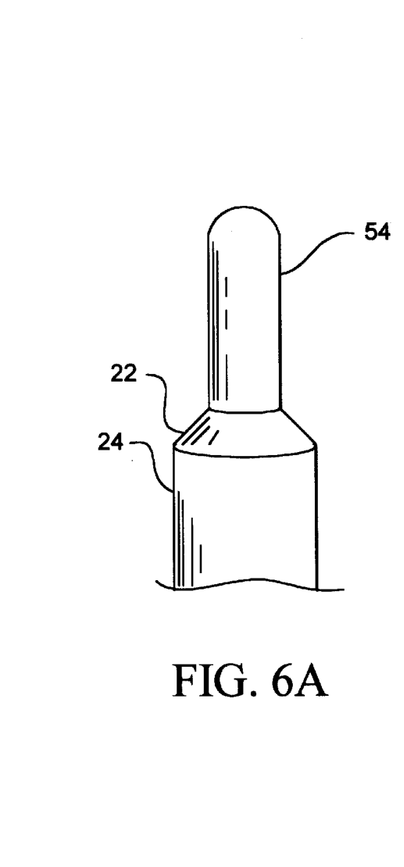
FIG. 6A illustrates a proximal member having an contracted section.
Figure 6B:
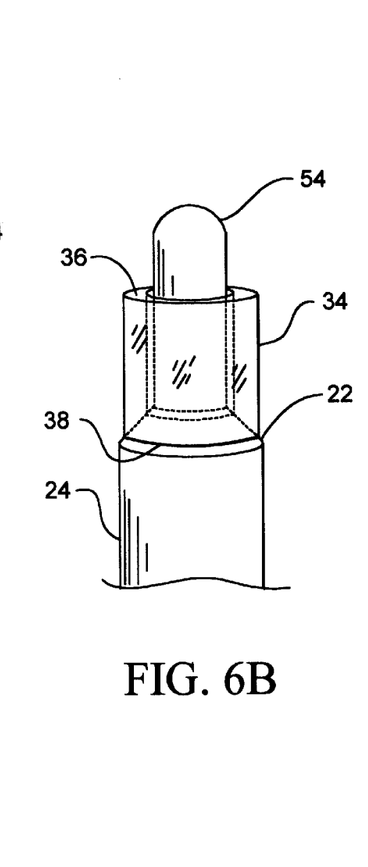
FIG. 6B illustrates a loop shaped ultrasound transducer positioned over the contracted section.
Figure 6C:
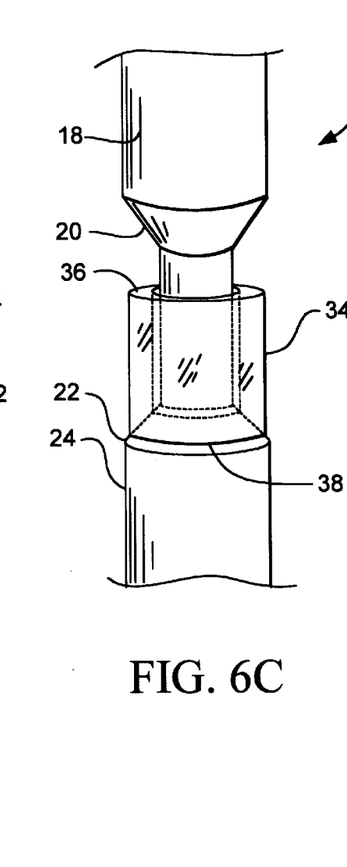
FIG. 6C illustrates a distal member being coupled with the proximal member.
Figure 6D:
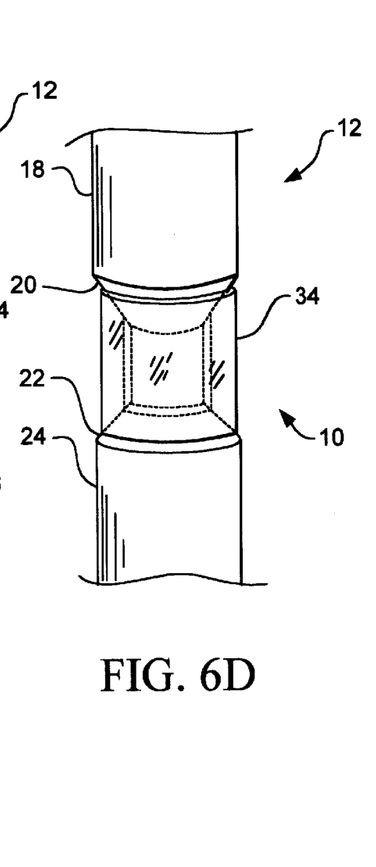
FIG. 6D illustrates the distal member moved into the desired position relative to the proximal member.

FIGS. 6A–6D illustrate a method for assembling a stylus 10 constructed from the proximal member and the distal member illustrated in FIGS. 3A–3D. FIG. 6A illustrates a proximal member having an insert 54 prepared to receive a loop shaped ultrasound transducer 34. In FIG. 6B, the ultrasound transducer 34 is positioned on the proximal member in an encircling relationship to the insert 54. Since the outer perimeter is larger than the proximal edge 36 of the ultrasound transducer 34, the ultrasound transducer 34 rests on the surface of the proximal mount section 20. FIG. 6C illustrates the distal member coupled with the proximal member such that the ultrasound transducer 34 encircles the surface of the proximal mount section 20 and the surface of the distal mount section 22. FIG. 6D illustrates the distal member moved closer to the proximal member until the ultrasound transducer 34 is suspended between the surface of the proximal mount section 20 and the surface of the distal mount section 22. An immobilizing medium can be applied to the proximal member and/or the distal member in order to fix the proximal member relative to the distal member. Similarly, an immobilizing medium can be applied to the surface of the proximal mount section 20 and/or the surface of the distal mount section 22 in order to immobilize the ultrasound transducer 34 relative to the stylus 10. The immobilizing media can be applied before or after the proximal member is coupled with the distal member. Suitable immobilizing media include, but are not limited to, adhesives and epoxies.

The method illustrated in FIGS. 6A–6D can easily be adapted to the embodiment of the stylus 10 illustrated in FIGS. 4A–4B and 5A–5C. The proximal and distal members can also be fixed relative to each other by ultrasound welding.

Figure 7:
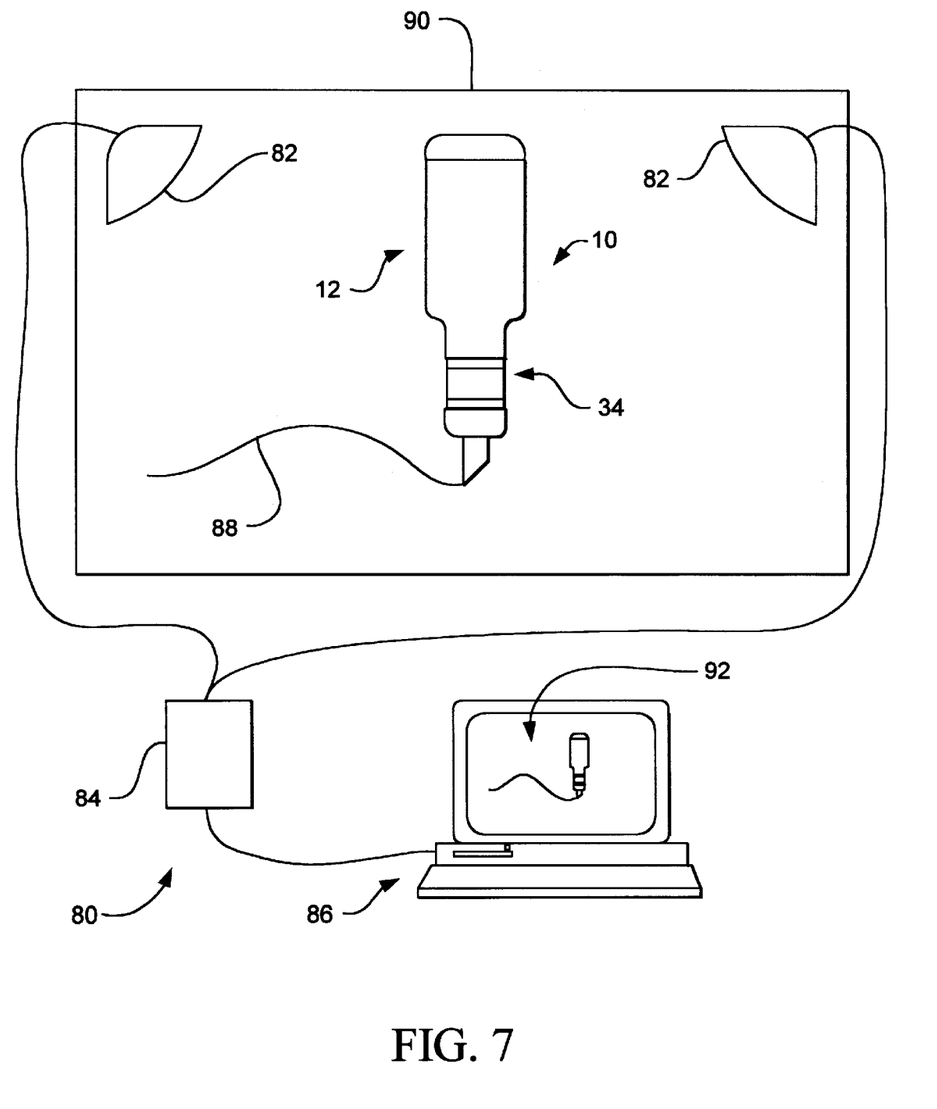
FIG. 7 illustrates a transcription system employing a stylus according to the present invention.

FIG. 7 illustrates an application for a stylus 10 according to the present invention. The illustrated stylus 10 is a writing implement 14 used with a transcription system 80. As illustrated, a transcription system 80 includes the stylus 10, a plurality of ultrasound detectors 82, a hardware unit 84 and a processing unit 86. Signals from ultrasound transducer 34 on the stylus 10 are transmitted to the plurality of ultrasound detectors 82. The processing unit 86 determines the time for these ultrasound signals to travel from the stylus 10 to the detectors 82 and then uses triangulation to determine the positions of the stylus 10 relative to the detectors 82. The transcription system 80 is operated by using the stylus 10 to write a written image 88 upon a writing surface 90. The processing unit 86 periodically determines the position as the stylus 10 is being used to write the written image 88. The processing unit 86 uses the determined series of positions to create a monitor image 92 which is similar to the written image 88.

Figure 8:
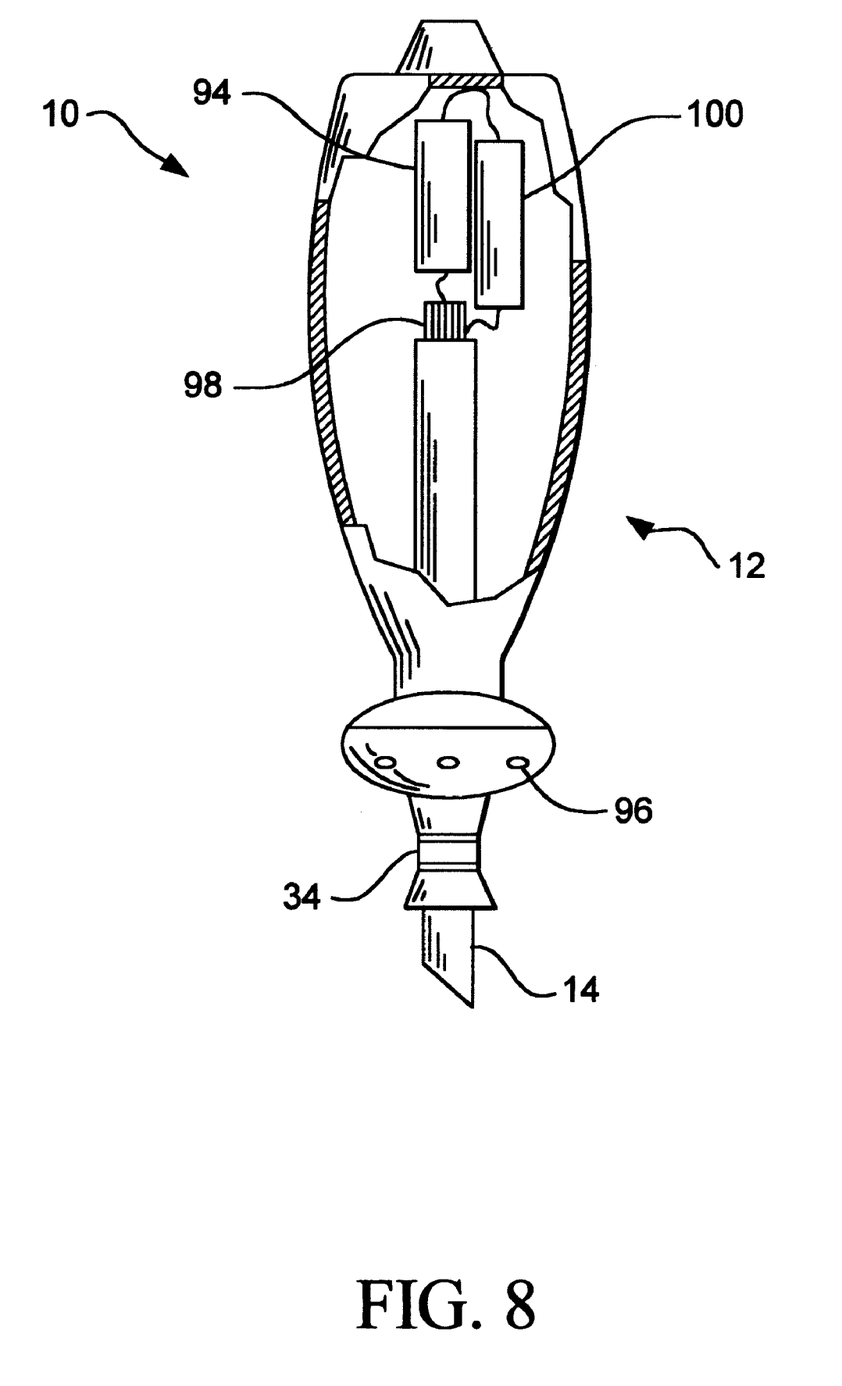
FIG. 8 is a cross section of a stylus for use with a transcription system.

FIG. 8 is a cross section of a stylus 10 for use with a transcription system 80. The stylus 10 includes a power source 94, an infra-red signal transducer 96, a pen-down switch 98 for indicating when the stylus 10 is being pressed against a writing surface 90 and a processor 100 which includes stylus control logic. During operation of the transcription system 80, the stylus 10 is used to write on a writing surface 90 such as a blackboard or a white board. The pen-down switch 98 provides a signal indicating that the stylus 10 is being used to write. In response to the signal from the pen-down switch 98, the stylus control logic causes ultrasound signals to be transmitted from the ultrasound transducer 34 and infra-red signals to be transmitted from the infrared transducer 34.

When the stylus 10 is used with a transcription system 80, the stylus 10 is preferably a writing implement 14 such as a magic marker or a dry-erase marker. Further, the ultrasound transducer 34 is preferably formed from PVDF with a thickness from 0.0005–0.005 inches and a diameter from 0.2–0.75 inches. The proximal edge inside perimeter of the ultrasound transducer 34 is preferably from 0.4–2.4 inches and the distal edge inside perimeter is preferably from 0.4–2.4 inches. Similarly, the proximal edge outside perimeter is preferably from 0.6–2.5 inches and the distal edge outside perimeter is preferably from 0.6–2.5 inches. The contracted section 42 preferably has an outer diameter from 0.15–0.75 inches. The angle between the ultrasound transducer 34 and the surface of the mount sections, $\alpha$, is preferably 20–30°.

While the present invention is disclosed by reference to the preferred embodiments and examples detailed above, it is to be understood that these examples are intended in an illustrative rather than limiting sense, as it is contemplated that modifications and combinations will readily occur to those skilled in the art, which modifications and combinations will be within the spirit of the invention and the scope of the appended claims.

What is claimed is:

1. An assembly for mounting an ultrasound transducer comprising:

an assembly body having a proximal end, a distal end and perimeters which are perpendicular to a longitudinal axis of the stylus body, the assembly body including a proximal mount section having an outer perimeter and an inner perimeter distal to the outer perimeter which is smaller than the outer perimeter, and a distal mount section positioned distal to the proximal mount section, the distal mount section having an outer perimeter and an inner perimeter proximal to the outer perimeter which is smaller than the outer perimeter; and a loop shaped ultrasound transducer surrounding the stylus body adjacent the proximal and distal mount sections such that a proximal edge of the ultrasound transducer conforms to a shape of the proximal mount section adjacent where the proximal edge contacts the proximal mount section and a distal edge of the ultrasound transducer conforms to a shape of the distal mount section adjacent where the distal edge contacts the distal mount section.

2. The assembly of claim 1, wherein the proximal mount section transitions in a proximal direction from the inner perimeter to the outer perimeter in a continuously changing manner and the distal mount section transitions in a distal direction from the inner perimeter to the outer perimeter in a continuously changing manner.

3. The assembly of claim 2, wherein the transitions of the proximal and distal mount sections from the inner perimeters to the outer perimeters each form a surface having a curved contour parallel to the longitudinal axis of the assembly body.

4. The assembly of claim 2, wherein the transitions of the proximal and distal mount sections from the inner perimeters to the outer perimeters each form a surface having a linear contour parallel to the longitudinal axis of the assembly body.

5. The assembly of claim 1, wherein the proximal mount section transitions from the inner perimeter to the outer perimeter in a stepwise manner and the distal mount section transitions from the inner perimeter to the outer perimeter in a stepwise manner.

6. The assembly of claim 1, wherein the proximal and distal mount members maintain a surface of the ultrasound transducer in a substantially cylindrical shape.

7. The assembly of claim 1, wherein the proximal mount section radially distends the proximal edge of the ultrasound transducer and the distal mount section radially distends the distal edge of the ultrasound transducer.

8. The assembly of claim 1, wherein the proximal mount section includes a surface connecting the inner perimeter to the outer perimeter, the connecting surface and a proximal edge of the ultrasound transducer intersecting at an angle between 20–30°.

9. The assembly of claim 1, wherein the proximal and distal edges of the ultrasound transducer have perimeters which are about a same size as the inner perimeters of the proximal and distal mount sections.

10. The assembly of claim 1, wherein the proximal and distal edges of the ultrasound transducer having perimeters which are larger than the inner perimeters of the proximal and distal mount sections.

11. The assembly of claim 1, wherein the assembly body includes a contracted section extending between the inner perimeter of the proximal mount section and the inner perimeter of the distal mount section.

12. The assembly of claim 11, wherein the contracted section has a cylindrical shape.

13. The assembly of claim 1, wherein the ultrasound transducer does not contact the assembly body between where the ultrasound transducer contacts the proximal and distal mount sections.

14. The assembly of claim 1, wherein the proximal mount section is coupled to the distal mount section.

15. The assembly of claim 1, wherein the assembly body is shaped so as to form an air gap between the ultrasound transducer and a assembly body.

16. The assembly of claim 1, wherein the assembly is a marker and the proximal mount section and the distal mount section are positioned adjacent a distal end of the marker.

17. The assembly of claim 1 wherein the assembly forms a portion of a stylus.

18. A kit for forming an assembly for mounting an ultrasound transmitter comprising:

a proximal member having perimeters which are perpendicular to a longitudinal axis of the proximal member, the proximal member including a proximal mount section having an inner perimeter and an outer perimeter proximal to the inner perimeter which is larger than the inner perimeter; and a distal member having perimeters which are perpendicular to a longitudinal axis of the distal member, the distal member including a distal mount section having an inner perimeter and an outer perimeter distal to the inner perimeter which is larger than the outer perimeter;

the proximal member being adapted to be coupled to a proximal end of the distal member such that a loop shaped ultrasound transducer surrounding the proximal and distal members adjacent the proximal and distal mount sections conforms to a shape of the proximal mount section adjacent where the ultrasound transducer contacts the proximal mount section and conforms to a shape of the distal mount section adjacent where the ultrasound transducer contacts the distal mount section.

19. The kit of claim 18, wherein the proximal mount section transitions in a proximal direction from the inner perimeter to the outer perimeter in a continuously changing manner and the distal mount section transitions in a distal direction from the inner perimeter to the outer perimeter in a continuously changing manner.

20. The kit of claim 19, wherein the transitions of the proximal and distal mount sections from the inner perimeters to the outer perimeters each form a surface having a curved contour parallel to the longitudinal axis of the assembly.

21. The kit of claim 19, wherein the transitions of the proximal and distal mount sections from the inner perimeters to the outer perimeters each form a surface having a linear contour parallel to the longitudinal axis of the assembly.

22. The kit of claim 19, wherein the proximal mount section transitions from the inner perimeter to the outer perimeter in a stepwise manner and the distal mount section transitions from the inner perimeter to the outer perimeter in a stepwise manner.

23. The kit of claim 18, wherein the proximal member and distal member, when coupled together, define a section between the inner perimeters of the proximal and distal mount sections having a perimeter that is smaller than the inner perimeters of the proximal and distal mount sections.

24. The kit of claim 23, wherein the section between the inner perimeters of the proximal and distal mount sections has a cylindrical shape.

25. The kit of claim 23, wherein the distal mount section is configured to be coupled with the proximal contracted section of the proximal member.

26. The kit of claim 25, wherein the distal mount section includes a port for receiving the proximal contracted section.

27. The kit of claim 26, wherein the port of the distal mount section includes a flange for limiting movement of the proximal contracted section within the port.

28. The kit of claim 18 wherein the assembly forms a portion of a stylus.

29. A method for assembling an ultrasound transmitter, comprising:

taking a loop shaped ultrasound transducer;

joining proximal and distal mount members such that the loop shaped ultrasound transducer surrounds a union of the proximal and distal mount members, the proximal mount member having a surface which abuts a proximal edge of the ultrasound transducer and the distal mount member having a surface which abuts a distal edge of the ultrasound transducer.

30. The method of claim 29 wherein an air gap is formed between the ultrasound transducer and the union of the proximal and distal mount members.

31. The method of claim 29 wherein loop shaped ultrasound transducer conforms to a shape of the proximal mount section adjacent where the ultrasound transducer contacts the proximal mount section and conforms to a shape of the distal mount section adjacent where the ultrasound transducer contacts the distal mount section.

32. The method of claim 29 wherein the proximal and distal mount members maintain a surface of the ultrasound transducer in a substantially cylindrical shape.

33. The method of claim 29 wherein the assembly forms a portion of a stylus.

* * * * *